Dec. 19, 1967     O. C. NORTON     3,358,922
MODULATING VALVE
Filed Oct. 20, 1965
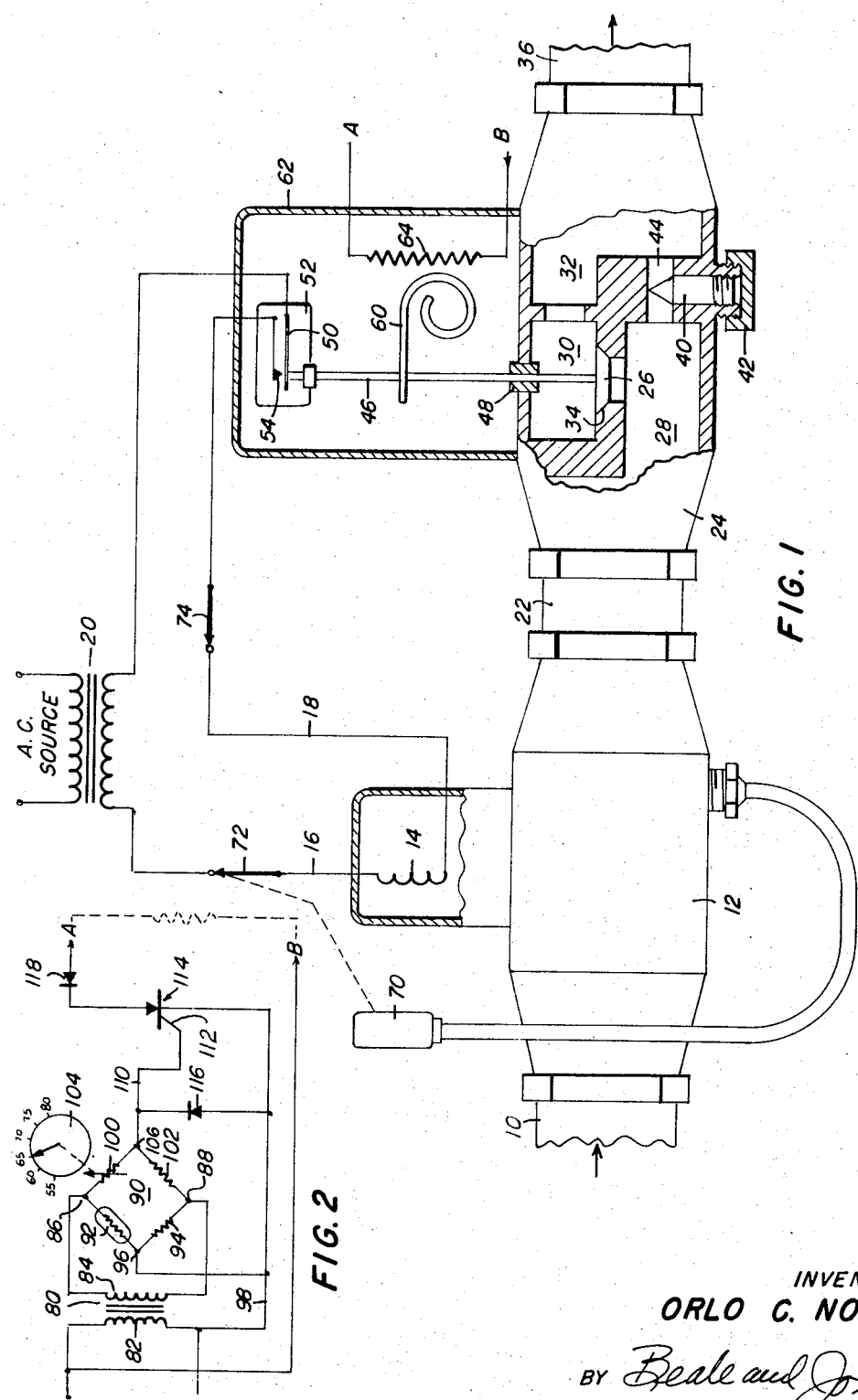
INVENTOR
ORLO C. NORTON
BY Beale and Jones
ATTORNEYS

United States Patent Office 3,358,922
Patented Dec. 19, 1967

3,358,922
MODULATING VALVE
Orlo C. Norton, Erie, Pa., assignor to Electr-o-Mech, Inc., Erie, Pa., a corporation of Pennsylvania
Filed Oct. 20, 1965, Ser. No. 498,323
14 Claims. (Cl. 236—9)

ABSTRACT OF THE DISCLOSURE

A modulating valve control system for thermostatic regulation of fuel flow, the flow being proportional to the output signal from a temperature-sensing circuit. The regulating circuit comprises a temperature-sensitive bridge circuit, the output of which is applied to the gate electrode of a silicon controlled rectifier. The current flow through the rectifier operates a heat motor which modulates the position of the valve. Switch means on the modulating valve operates a safety valve to shut off fuel flow under predetermined conditions.

Field of the invention

The present invention relates to fuel burning systems and particularly to apparatus for controlling the flow of fuel to heating apparatus, cooling systems or the like, or for controlling the mixing of liquids of various kinds.

Description of the prior art

In prior fuel control systems, a thermostat has been provided to sense temperature conditions in the area to be controlled and to operate a valve mechanism in response to signals due to variations from the norm. When such systems are used to control a heating plant, the valve mechanism is opened when the temperature falls below a given point, permitting fuel to flow to the burner, and, when the temperature rises above the selected point, the control valve is closed and the burner turns off. This type of on-off, or differential, operation is not entirely satisfactory in that it does not give a continuous response to changes in temperature, but results in a temperature cycle that can be uncomfortable when used in a home or office heating system and which may be totally unsuitable for use in industrial applications.

The thermostats generally in use today with heating systems are mechanical devices such as bimetallic switches. These switches respond to changes in temperature to open or close a control circuit and thus inherently produce the differential type of operation which results in heat cycling. In addition, presently-used systems generally utilize two-position flow valves which respond to the closing of the control circuit to open the valve and cause the valve to fully close upon opening of the control circuit, thus adding to the cycling effect.

Summary of the invention

It is, therefore, an object of the present invention to provide an improvement over prior systems whereby a continuous control of a fuel system can be obtained.

Another object of the invention is to provide a fuel control system wherein the use of mechanical thermostatic controls and two-position valves is eliminated in order to permit smooth and continuous control of fuel flow.

Another object of the invention is to provide a remotely controlled thermostatic flow control for gaseous or vapor fuels wherein a control valve is modulated in accordance with the output of the thermostat.

Another object of the invention is to provide a solid state thermostat control circuit which eliminates the need for mechanical sensing devices and to provide a modulating valve which closely follows the output signal from this temperature-sensing circuit to produce a continuous control of fluid flow through the valve.

An additional object of the invention is to provide a valve which is driven between its open and closed positions by means of a bimetallic element in response to the magnitude of an output signal received from a temperature-sensitive circuit.

An additional object of the invention is to provide a modulating valve control system having a solid-state temperature-sensitive circuit, a flow control unit, a bypass for maintaining a small flame in the burner at all times, a pilot cut-off for shutting down the apparatus in the event of failure of the fuel supply and means for shutting down the system entirely in the event that there is no further need for fuel to be supplied to the burner.

In the present system, thermostatic control of a valve is obtained through a bridge circuit to permit continuous modulated control of the flow of a liquid, vapor or vapor fuel through the valve. The opening or closing of the valve is controlled by means of the output signals obtained from a bridge circuit which utilizes a thermistor or other temperature sensitive device to unbalance the bridge circuit in response to a change of temperature from the normal, or set, value. The output from the unbalanced bridge is applied to the control element of a solid state controlling device such as a silicon controlled rectifier (SCR) which regulates the flow of current through a heater element. The heater element is located adjacent to a bimetallic member which is mechanically connected to the modulating valve. The position of the bimetallic member corresponds to the magnitude of current flow through the heating element; thus, the position of the valve also corresponds to that current flow. The position of the valve, of course, controls the volume of fuel flow. The greater the change in ambient temperature sensed by the bridge, the greater will be the motion of the valve.

Brief description of the drawings

Further objects and features of the invention will best be understood and appreciated from the following detailed description of a preferred embodiment thereof, selected for purposes of illustration and shown in the accompanying drawings, in which:

FIG. 1 is a partial cross-sectional view of a modulating valve made in accordance with the teachings of the present invention; and FIG. 2 is a schematic diagram of the thermostatic control system for such a valve.

Description of the preferred embodiment

The present embodiment of the invention is described in connection with a heating system for convenience in illustration. It is to be understood that the invention is equally useful in cooling system applications or in any apparatus where continuous flow control in response to temperature change is desired.

Referring now to the apparatus of FIG. 1, there is indicated at 10 a fuel supply line which provides a gaseous or vapor fuel, such as natural gas, from any suitable source for use in a burner such as that used in a home system. The fuel passes through a solenoid-operated safety valve 12 which is operable to cut off gas flow to the rest of the system either upon failure of the gas supply or occurrence of an open circuit condition in the solenoid supply network. Safety valve 12 may be of a conventional type operated by a solenoid coil 14 connected through lines 16 and 18 to the secondary winding of a supply transformer 20. The primary transformer winding is connected to a conventional source of alternating current.

After leaving safety valve 12, the fuel is directed through connecting line 22 to modulating valve body 24 which encloses the modulating valve 26. The valve body encloses passages 28, 30 and 32 through which the gas flows when modulating valve 26 is open. Passageway 30 forms the valve seat onto which the valve 26 is seated to close off the flow to outlet pipeline 36 and thence to the burner.

Also included in the valve body 24 is a bypass valve 40 which is adjustable by means of threaded knob 42 to open or close off passageway 44 which bypasses the modulating valve 26. Bypass valve 40 may be adjusted to establish a minimum flow of fuel through valve body 24 to the burner to insure that the burner flame does not go out entirely until a positive shutdown of the system occurs.

Attached to modulating valve 26 and passing through valve body 24 is a valve stem 46. This valve stem is slidably mounted in the valve body 24 by means of a bushing and gas seal 48. One end of valve stem 46 is fixed to the valve 26 for motion therewith; the opposite end of the stem is attached to a movable arm 50 of a switch mechanism 52 so that the movable arm is in contact with switch element 54 whenever modulating valve 26 is open. Connected to valve stem 46 in driving relationship therewith is a bimetallic member 60, one end of which is immovably attached to the housing 62. A heating element 64 supplied with current from the thermostat circuit of FIG. 2 is mounted near member 60 to heat the bimetallic member and to cause it to move. The motion of member 60 is proportional to the heat procured by element 64; therefore the motion of modulating valve 26 is proportional to the output of the temperature sensing circuitry.

Connected to the burner side of safety valve 12 is a pilot burner 70, normally located within the furnace near the burner but shown here for purposes of illustration as being located near the safety valve. Located near and heated by the pilot is a temperature controlled switch 72, which is connected in series with the solenoid 14 and the secondary winding of transformer 20. This switch is held in a closed position by the heat from the pilot burner, but upon failure of the gas supply, the pilot light will go out, reducing the temperature of switch 72 and causing it to open to break the energization circuit of solenoid 14. This closes the safety valve 12 and prevents a further supply of gas to the burner until such time as the pilot is relighted. This is a conventional safety arrangement and prevents the dangerous accumulation of gas in the burner upon restoration of the fuel supply.

Also connected in series with the solenoid 14 is switch 52 which is connected to the modulating valve, as described above. This switch is normally closed when the valve is opened and supplying gas to the burner, but when the valve 26 closes as a result of a high ambient temperature and no demand from the thermostat, switch 52 will open and break the circuit to solenoid 14. This deenergizes solenoid 14 and causes the safety valve 12 to close, shutting down the system and cutting off even the minimum flame fed by the bypass valve. Also connected in series with solenoid 14 is a service shut-down switch 74 which permits the system to be closed down for servicing or the like.

To provide a modulation control current for the heating element 64, the temperature sensitive circuit of FIG. 2 is utilized. This circuit may be placed at any desired location and it normally would be remote from the modulating valve and burner apparatus. This circuit is connected to a source of alternating current through a stepdown transformer 80 having primary and secondary windings 82 and 84, respectively. If convenient, secondary winding 84 may be wound on transformer 20 so that only a single transformer would be necessary for the system.

Secondary winding 84 is connected to the input terminals 86 and 88 of a temperature sensitive bridge circuit 90. Connected between the terminals 86 and 88 are the two arms of the bridge circuit. The first arm comprises the series connection of a thermistor or similar temperature sensitive device 92 and a resistor 94. The junction 96 of the termistor and the resistor are connected to the ground side of primary winding 82 through wire 98. The second arm of the bridge circuit comprises a variable resistor 100 connected in series to a resistor 102. Variable resistor 100 is connected to a conventional temperature control dial 104 to permit adjustment of the balance point of the bridge to correspond to the desired ambient temperature. Thermistor 92 is sensitive to the ambient temperature and its resistance will be equal to that of variable resistance 100 when dial 104 is set at the ambient temperature. Under this condition, the bridge will be balanced at its null point and will provide no output signal. However, when the resistance of thermistor 92 differs from that of resistor 100 an output signal will appear at the junction of resistors 100 and 102. This junction 106 is connected through line 110 to the control, or gate, electrode 112 of a silicon controlled rectifier (SCR) 114. The AC bridge 90 is shunted by a diode 116 connected between junction 106 and ground line 98, thus limiting the output of the bridge to a half cycle. This half cycle is applied to gate electrode 112 of the SCR and its magnitude determines the point of conduction of the SCR. Connected in series with the anode and cathode of the SCR is a second diode 118, which limits the flow of current through the SCR to a half cycle of AC, the heater element 64, and the primary winding 82 of transformer 80. The resultant modulation control signal through the heater element 64, which is connected across terminals A and B of FIG. 2, is a function of the magnitude of the bridge output signal applied to gate electrode 112 and thus is also a function of the difference between the ambient temperature sensed by thermistor 92 and the setting of variable resistor 100.

In description the operation of the present system, it will be assumed that the ambient temperature is lower than the desired temperature and that heat is to be supplied to the area where the thermostat is located. Under this condition, the resistance of thermistor 92 and that of variable resistance 100 differs and bridge 90 is unbalanced. An alternating current output signal will therefore appear at junction 106, the magnitude of this signal being proportional to the difference in resistance between the two variable elements of the bridge. A portion of this signal will be shunted to ground through diode 116; the remaining half cycle will be applied to the control electrode 112 of SCR 114. The magnitude of the control signal applied to the SCR will control the length of time during a given half cycle that the SCR will be conductive and thus will control the resultant flow of current through the heating element 64. This resultant current flow will determine the temperature of element 64 and thus will regulate the temperature of the bimetallic element 60 which is attached to the valve stem 46. The greater the current flow through heater 64, the greater will be the motion of bimetallic member 60. Motion of the bimetallic member will open modulating valve 26; the amount the valve is open will be dependent upon the temperature of the heating element 64 and thus upon the difference between the ambient and desired temperatures. The greater this difference, the further open will be valve 26. When valve 26 is open, fuel will flow through valve body 24 to the burner to generate heat, causing the ambient temperature to rise. As the temperature rises, the difference between the ambient and desired temperatures will decrease, decreasing the output of the bridge and the temperature of heating element 64 and gradually closing valve 26. As the valve closes, less fuel will be fed to the burner and less heat will be produced. This will result in a reduction of the rate at which the ambient temperature approaches the desired temperature and the rate of reduction will become less and less as the ambient temperature approaches the desired temperature.

As the ambient temperature approaches the desired level and the valve gradually closes, a point will be reached where the amount of heat being supplied by the burner will be equal to the heat loss from the area controlled by the thermostat. This will cause the temperature of the control area to level out at a value slightly below the desired value so that the bridge will remain slightly unbalanced. This will hold the modulating valve 26 open just enough to maintain this difference and thus maintain a constant level temperature in the controlled area. Since this difference might be very small and thus result in a low volume of fuel passing through the modulating valve, there is a possibility that a very erratic flame might develop in the burner. To insure against this occurrence, the bypass valve 40 is provided to produce a predetermined minimum flame at a level that will insure that it will not flicker out.

If the ambient temperature surrounding the control circuit should rise to a point where there is no demand for heat, the bridge circuit 90 would become unbalanced and no output would appear at junction 106. This would cut off SCR 114 and prevent any current from flowing through heating element 64. Modulating valve 26 would then close completely and the valve stem 46 would open switch 52, thus opening the energization circuit of solenoid 14 and causing the safety valve 12 to close. This would cut off all flow of fuel to the burner, including the flow to pilot 70. This would, in turn, open switch 72. The closing of safety valve 12 insures that no fuel will pass through either modulating valve 26 or bypass valve 40, thus providing a positive shut-down for the burner. If, at a later time, a demand should arise for more heat and bridge 90 again becomes unbalanced, the bimetallic element will open modulating valve 26 and will close switch 52. It will then be necessary to light pilot 70 so that switch 72 can close to complete the circuit to solenoid 14. Upon completion of this circuit, the safety valve 12 will open, permitting fuel to flow through valve body 24 to the burner where the burner flame will be reestablished by means of the pilot.

If desired, an auxiliary safety valve may be provided in addition to the safety valve 12 to operate under the control of the pilot and to close down the system upon failure of the gas supply. If such an auxiliary safety valve was provided, the pilot would remain lighted upon closure of safety valve 12 so that the burner flame could be re-established without the necessity of relighting the pilot. The safety valve 12 would then be used as a positive cut-off for the bypass valve 40 upon closure of modulating valve 26.

The foregoing description has set forth in detail one embodiment of an improved flow control unit which is operable in response to temperature variations to provide a desired response. However, the scope of the invention is not limited to the specific embodiment described above, but includes the various alternatives and modifications that fall within the true spirit and scope of the invention as defined by the following claims.

I claim:

1. In a fluid flow control system, a flow line; modulating valve means in said flow line for regulating the flow therethrough; solid-state temperature sensitive circuit means for producing a modulation control signal proportional to the deviation of ambient temperature from the desired value, said circuit means including a bridge circuit having a pair of input terminals and two arms connected between said input terminals, the first arm including a thermistor in series with a first fixed resistance, and the second arm including a variable resistor in series with a second fixed resistance, the resistance of said thermistor varying with changes in said ambient temperature and the resistance of said variable resistor being changeable to select said desired value, whereby said bridge has a null point when said ambient temperature equals said desired value; means for obtaining from the junction of the resistance in one of the said arms of said bridge circuit an output signal proportional to the difference between said ambient temperature and said desired value, and for applying said output signal to the gate electrode of a silicon controlled rectifier to control the conductivity thereof, said modulation control signal being carried by the anode and cathode of said silicon controlled rectifier; and means responsive to said modulation control signal for modulating said valve means, whereby the passage of fluid through said valve means is proportional to said temperature difference.

2. The system of claim 1, further including a source of alternating current connected across said input terminals and first diode means connected from the junction of the series-connected elements of one arm to the junction of the series-connected elements of the other arm.

3. The system of claim 2, wherein said gate electrode is connected to the junction of the series-connected resistances of said second bridge arm, said rectifier having said anode and said cathode connected in series with a source of alternating current and a second diode to provide said modulation control signal.

4. The system of claim 3, wherein said means responsive to said modulation control signal comprises a heating element and an associated bimetallic member, said bimetallic member being adapted to move said modulating valve means in accordance with the temperature of said heating element.

5. The system of claim 4, wherein said modulating valve means includes a valve body connected in said flow line, a fluid passageway through said valve body, a modulating valve for opening and closing said passageway, and a valve stem connected to said modulating valve and extending through said valve body for connection to said bimetallic member, whereby motion of said bimetallic member is transmitted to said valve.

6. The system of claim 1, wherein said means responsive to said modulation control signal comprises a heating element connected in series with said anode and cathode and a bimetallic member in heat-transfer relationship with said heating element, said bimetallic member being adapted to open and close said modulating valve means in accordance with the temperature of said heating element.

7. The system of claim 6, wherein said modulating valve means includes a valve stem connected to said bimetallic member for motion therewith.

8. The system of claim 5, further including electrically-operated safety valve means connected in said flow line, means for energizing said safety valve means to hold it in an open condition, and switch means for releasing said safety valve means to shut off the flow of fluid through said flow line.

9. The system of claim 8, wherein said switch means includes a moveable arm contact and a fixed contact, said moveable arm being attached to said valve stem so as to hold said switch closed when said modulating valve is open and to permit said switch to open when said modulating valve is closed, whereby said system will shut down when said temperature-sensitive circuit reaches a null point.

10. The system of claim 9, wherein said valve body further includes bypass means to establish a minimum fluid flow.

11. In a fluid flow control system, a flow line; modulating valve means in said flow line for regulating the flow therethrough; solid-state temperature sensitive circuit means for producing a modulation control signal proportional to the deviation of ambient temperature from a desired value; a heating element responsive to said modulation control signal; a bimetallic member in heat-transfer relationship with said heating element and connected to said valve means, said bimetallic element being adapted to open and close said modulating valve means in accordance with the temperature of said heating element; solenoid-operated safety valve means connected in said flow line; and switch means in series with said solenoid, said switch means being operated by the motion of said modulating valve to close said safety valve upon closure of said modulating valve means.

12. The system of claim 11, wherein said circuit means comprises a bridge having a null point when the ambient temperature of said bridge equals said desired value, and having an output signal proportional to the difference between said ambient temperature and said desired value; a silicon controlled rectifier having an anode, a cathode, and a gate; means for applying said output signal to said gate to control the conductivity of said silicon controlled rectifier, said modulation control signal being carried by said anode and cathode.

13. The system of claim 12, wherein the anode and cathode of said silicon controlled rectifier are connected in series with a source of alternating current to provide said modulation control signal.

14. The system of claim 12, further including adjustable bypass means for said modulating valve means to establish a minimum flow through said flow line when said modulating valve means is open.

References Cited

UNITED STATES PATENTS

| | | | |
|---|---|---|---|
| 2,919,858 | 1/1960 | Matthews | 236—1 |
| 3,008,641 | 11/1961 | Hopkins | 236—1 |
| 3,165,681 | 1/1965 | Pinckaers | 236—78 X |
| 3,168,242 | 2/1965 | Diener | 236—75 |
| 3,211,214 | 10/1965 | Chambers | 236—68 X |
| 3,254,494 | 6/1966 | Chartouni | 62—3 |

EDWARD J. MICHAEL, *Primary Examiner.*